(12) United States Patent
Brooks et al.

(10) Patent No.: US 10,569,704 B2
(45) Date of Patent: Feb. 25, 2020

(54) AMBIENT LIGHTING SYSTEM FOR AN AGRICULTURAL MACHINE

(71) Applicant: CNH Industrial America LLC, New Holland, PA (US)

(72) Inventors: Nathan P. Brooks, Manitowoc, WI (US); Steven N. Winkel, Kiel, WI (US); Robert Schnell, St. Nazianz, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/805,380

(22) Filed: Nov. 7, 2017

(65) Prior Publication Data
US 2019/0135171 A1 May 9, 2019

(51) Int. Cl.
| | |
|---|---|
| *B60Q 1/00* | (2006.01) |
| *B60Q 3/00* | (2017.01) |
| *B60Q 3/40* | (2017.01) |
| *B60Q 3/66* | (2017.01) |
| *B60Q 3/72* | (2017.01) |
| *A01B 76/00* | (2006.01) |
| *B60Q 3/82* | (2017.01) |
| *A01C 23/00* | (2006.01) |

(52) U.S. Cl.
CPC ............... *B60Q 3/40* (2017.02); *A01B 76/00* (2013.01); *B60Q 3/66* (2017.02); *B60Q 3/72* (2017.02); *B60Q 3/82* (2017.02); *A01C 23/00* (2013.01)

(58) Field of Classification Search
USPC .................................................. 362/485
See application file for complete search history.

(56) References Cited

U.S. PATENT DOCUMENTS

| | | | |
|---|---|---|---|
| 5,498,929 A | 3/1996 | Formwalt | |
| 5,678,914 A * | 10/1997 | Dealey | B60Q 3/66 362/485 |
| 6,216,614 B1 * | 4/2001 | Wollenhaupt | A01B 79/005 111/118 |
| 6,292,097 B1 | 9/2001 | Tewell | |
| 6,427,612 B1 * | 8/2002 | Huffman | A01C 23/008 111/118 |
| 6,517,226 B1 | 2/2003 | Zimmermann et al. | |
| 6,717,376 B2 | 4/2004 | Lys et al. | |
| 6,735,889 B1 * | 5/2004 | Berger | E02F 9/2004 37/348 |

(Continued)

FOREIGN PATENT DOCUMENTS

WO 2015026296 A1 2/2015

*Primary Examiner* — Tuyen K Vo
(74) *Attorney, Agent, or Firm* — Rebecca L. Henkel; Rickard K. DeMille

(57) ABSTRACT

An ambient light controller in an agricultural machine can control multicolor lights arranged in an operator cab of the machine to project light around structures in the cab to areas that are perceivable by a forward facing operator to convey useful information about the machine to the operator. The lights can be projected around such structures by using light pipes. The lights can preferably be in a color which minimizes glare inside the cab to avoid distraction. The light controller can monitor various functions of the machine, such as boom height, and change colors and/or patterns of the lights to indicate states corresponding to the conditions, such as a normal state and a fault state.

18 Claims, 4 Drawing Sheets

(56) References Cited

U.S. PATENT DOCUMENTS

| | | | |
|---|---|---|---|
| 6,914,521 B2 | 7/2005 | Rothkop | |
| 7,298,249 B2 | 11/2007 | Avery et al. | |
| 7,525,254 B2 | 4/2009 | Lys et al. | |
| 8,482,430 B2 | 7/2013 | Szczerba | |
| 8,754,426 B2 | 6/2014 | Marx et al. | |
| 8,862,320 B2 | 10/2014 | Kohlstrand et al. | |
| 2005/0276053 A1* | 12/2005 | Nortrup | F21V 19/001 362/294 |
| 2006/0022214 A1* | 2/2006 | Morgan | F21K 9/00 257/99 |
| 2006/0164332 A1* | 7/2006 | Matti | B29C 45/37 345/32 |
| 2007/0021913 A1* | 1/2007 | Heiniger | A01B 69/008 701/412 |
| 2007/0252681 A1* | 11/2007 | Costello | B60R 25/04 340/426.3 |
| 2010/0214795 A1* | 8/2010 | Salter | B60Q 3/54 362/488 |
| 2012/0242466 A1* | 9/2012 | Stillfried | B60Q 1/2611 340/425.5 |
| 2012/0283914 A1* | 11/2012 | Karwaczynski | B62D 1/046 701/41 |
| 2012/0316735 A1* | 12/2012 | Von Mezynski | B60Q 1/24 701/48 |
| 2014/0226303 A1 | 8/2014 | Pasdar | |
| 2015/0066290 A1* | 3/2015 | Ruffner | B60Q 1/50 701/33.9 |
| 2015/0239394 A1* | 8/2015 | Willerton | B60Q 3/51 362/581 |
| 2017/0355321 A1* | 12/2017 | Dellock | B60R 13/00 |
| 2018/0053414 A1* | 2/2018 | Qin | G08G 1/0112 |

\* cited by examiner

AMBIENT LIGHTING SYSTEM FOR AN AGRICULTURAL MACHINE

FIELD OF THE INVENTION

The invention relates generally to agricultural product application equipment such as self-propelled sprayers and, in particular, to an ambient lighting system which includes lights having light pipes configured to transport light around structures in an operator cab to project light in an interior area that is perceivable by a forward facing operator in the operator cab for indicating the state corresponding to monitored functions of the machine.

BACKGROUND OF THE INVENTION

High-clearance sprayers are getting larger and more complex to allow for increasing coverage in a single pass, which improves application efficiency. Sprayers also oftentimes include operator comfort features, such as HVAC systems, storage, and cab lighting that allow operators to stay in the sprayer for longer application sessions while reducing operator stress and fatigue. Some in-cab lighting systems include lighted cup holders to help operators find the cup holders in the dark. Dome lights are also oftentimes mounted in the cab. However, turning on dome lights can cause excessive glare on the windows, reducing visibility out of the cab, particular at night. As a result, dome lights are typically left off when actively spraying, which leaves poor visibility in some parts of the cab, particularly in low light conditions outside.

SUMMARY OF THE INVENTION

An ambient light controller in an agricultural machine can control multicolor lights arranged in an operator cab of the machine to project light around structures in the cab to areas that are perceivable by a forward facing operator to convey useful information about the machine to the operator. The lights can be projected around such structures by using light pipes. The lights can preferably be in a color which minimizes glare inside the cab to avoid distraction. The light controller can monitor various functions of the machine, such as boom height, and change colors and/or patterns of the lights to indicate states corresponding to the conditions, such as a normal state and a fault state.

In one aspect, light pipes can be provided at the backs of the cabs to let the operators see, for example, storage compartments and chargers. The LED's can be blue to minimize glare. Different color LEDs can be arranged to illuminate the light pipes with different colors in the cab. A controller can control the LED's or which color LED is energized to convey information to the operators. For example, to indicate faults in the sprayer, the controller may blink the LED's and/or may change which color LED illuminates the light pipes.

As used herein, a light pipe refers to a physical structure used for transporting or distributing natural or artificial light for the purpose of illumination. Such light pipes may include hollow structures configured to contain light with a reflective lining and/or transparent solids configured to contain light by total internal reflection. Such light pipes may be rigid or flexible.

Specifically then, one aspect of the present invention can provide an ambient lighting system for an agricultural machine. The ambient lighting system can include: multiple multicolor lights arranged in an operator cab, each multicolor light having a light pipe configured to transport light around a structure in the operator cab to project the light in an interior area of the operator cab so that the light is perceivable by a forward facing operator in the operator cab; and an ambient lighting controller in communication with the multicolor lights. The ambient lighting controller can execute a program stored in a non-transient medium to: monitor multiple functions of the agricultural machine; determine a state from among multiple states according to one or more of the monitored functions; and illuminate the multicolor lights in a same color and a same pattern to indicate the determined state.

Another aspect of the present invention can provide an agricultural sprayer including: a chassis supported by multiple wheels; a sprayer boom extending transversely relative to the chassis; an operator cab supported by the chassis, the operator cab including multiple multicolor lights arranged, each multicolor light having a light pipe configured to transport light around a structure in the operator cab to project the light in an interior area of the operator cab so that the light is perceivable by a forward facing operator in the operator cab; and an ambient lighting controller in communication with the multicolor lights. The ambient lighting controller can execute a program stored in a non-transient medium to: monitor a plurality of functions of the agricultural sprayer; determine a state from among a plurality of states according to one or more of the monitored functions; and illuminate the multicolor lights in a same color and a same pattern to indicate the determined state.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
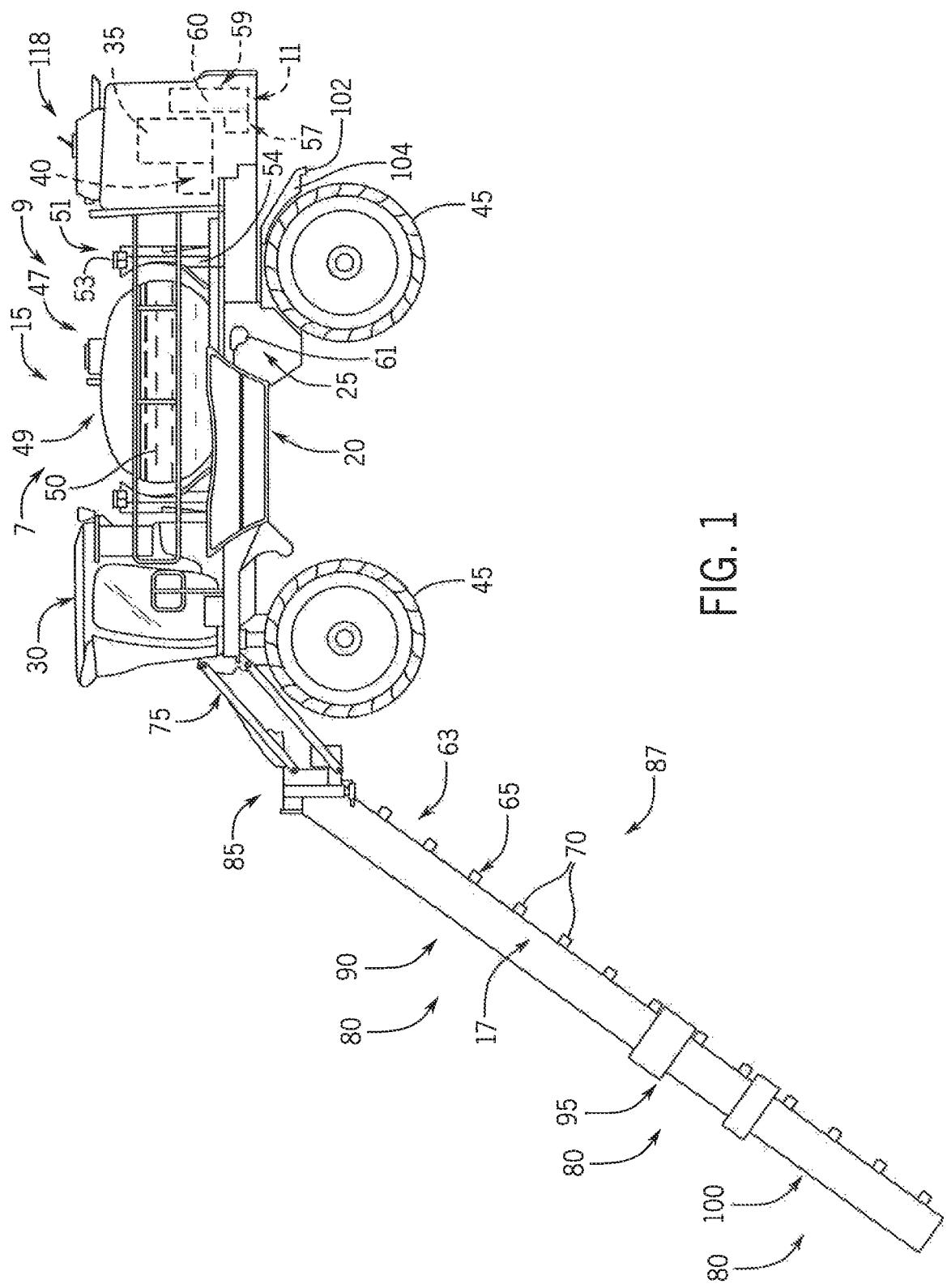
FIG. 1 is a side elevation of an exemplar agricultural machine according to the present invention.

Referring now to the drawings and specifically to FIG. 1, an agricultural sprayer is shown here as a self-propelled agricultural sprayer vehicle or self-propelled sprayer 15 having a spray boom 17, such as those available from CNH Industrial, including the Miller Nitro and Condor Series sprayers and New Holland Guardian Series sprayers. The sprayer 15 includes chassis 20 having chassis frame 25 that supports various assemblies, systems, and components.

These various assemblies, systems, and components include an operator cab 30, an engine 35, and a hydraulic system 40. The hydraulic system 40 receives power from the engine 35 and includes at least one hydraulic pump which may be in a hydrostatic arrangement for providing hydraulic pressure for operating hydraulic components within the hydraulic system 40. For sprayers with hydrostatic drives, hydraulic motors are operably connected to the hydraulic pump(s) for rotating wheels 45. In mechanical drive applications, a mechanical transmission receives power from engine 35 and delivers power for rotating wheels 45 by way of power-transmitting driveline components such as drive shafts, differentials, and other gear sets in portal, drop boxes, or other housings.

Still referring to FIG. 1, a product system 7 can include a product storage system 47 with a product tank 49 storing an agricultural liquid product 50 on the chassis 20. Product 50 can include any of a variety of agricultural liquid products, such as various pesticides, herbicides, fungicides, liquid fertilizers, and other liquids including liquid suspensions beneficial for application onto agricultural fields by way of boom 17. A rinse system 9 can include a rinse liquid storage system 51 having rinse tank 53 storing a rinse liquid 54 such as water or another suitable rinse liquid. Also, an air purge system 11 can include a compressed air storage system having an air compressor 57 operably connected to air tank 59 that stores air 60 compressed by compressor 57. A flow system is configured to selectively direct liquid product 50, rinse liquid 54, or air 60 through various flow paths defined through the sprayer 15 and boom 17 depending on whether a spraying procedure, a rinsing procedure, or a pneumatic purging or boom blow-out procedure is being performed. During spraying and rinsing procedures, the flow system can energize a pump 61 to convey either liquid product 50 or rinse liquid 54 to the boom 17.

In operation, the pump 61 can push either liquid product 50 or rinse liquid 54 through plumbing components such as interconnected pieces of tubing and through a boom flow system 63 that includes segments of boom tubing 65 for release out of spray boom nozzles 70 that are spaced from each another along the width of the boom 17 during spraying or rinsing operations of sprayer 15 (according to activation/deactivation states which can be implemented, for example, using electronically controlled switches). Accordingly, such plumbing components can connect the product storage system 47, the rinse liquid storage system 51 and the boom 17 via an on-board valve system and boom valve system. Groups or banks of multiple adjacent spray boom nozzles 70 can define multiple spray sections of a spray system of sprayer 15. During spraying procedures, the spray sections defined along the boom 17 can selectively deliver product 50 for release onto an agricultural field at locations corresponding to positions of activated spray sections. The boom 17 is connected to the chassis 20 with a lift arm assembly 75 that is configured to move the boom 17 up and down for adjusting the height of application of the product 50.

Figure 2:
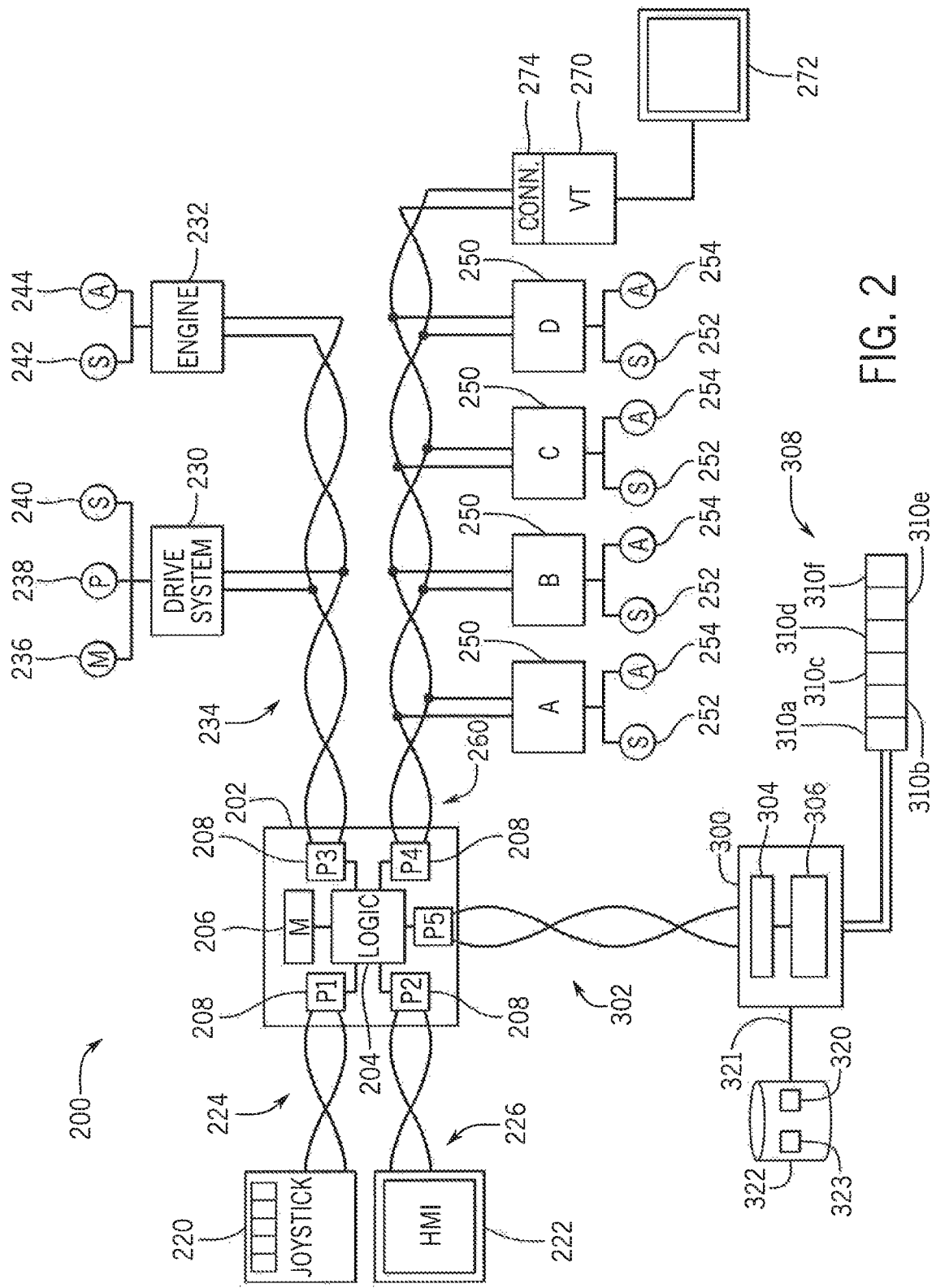
FIG. 2 is a simplified schematic of an ambient lighting system for the agricultural machine of FIG. 1.

Referring now to FIG. 2, a simplified schematic of an ambient lighting system 200 for the sprayer 15 is provided in accordance with the present invention. The ambient lighting system 200 can include a machine controller 202 which may comprise a processing element 204, a memory 206 and a plurality of ports 208, such as ports "P1," "P2," "P3" and "P4." Each of the ports 208 may be electrically and logically configured to communicate according to one of various Controller Area Network (CAN) bus interface protocols, including for example Society of Automotive Engineers (SAE) J1939, International Organization for Standardization (ISO) 11783 (ISOBUS), ISO 11898, and the like, whose specifications are published and whose protocols are used broadly by a number of manufacturers and suppliers, including CNH Industrial. Accordingly, each of the ports 208 may communicate messages to one or more devices connected to the respective port.

In the ambient lighting system 200, one or more input modules may be connected to the machine controller 202, via the ports 208. The input modules may be positioned in the cab 30 such that they may be used to receive commands from an operator of the sprayer 15 for affecting various functions with respect to the machine. For example, a joystick 220 (or grip) may be a first input module connected to P1, and a touchscreen Human Machine Interface (HMI) 222 may be a second input module connected to P2. The joystick 220 may consist of a stick that pivots or otherwise moves along a base and sends a corresponding angle or direction as a command to the respective port. The joystick 220 may also include a plurality of buttons or switches for providing additional commands to the respective port, such as activation or deactivation of individual spray sections, activation or deactivation of automatic steering, height control of a center section with respect to the boom 17, tilt control of the boom 17, engine speed control, and the like, each of which being functions of the sprayer 15 subject to monitoring. The HMI 222 may consist of a graphical user interface allowing display of one or more of the aforementioned functions while also permitting commands to the respective port by an operator touching the screen. The joystick 220 may be connected, for example, to port P1, via a first data communication bus 224 or path which could be a CAN bus implementing SAE J1939 via twisted pair cabling. Similarly, the HMI 222 may be connected, for example, to port P2 via a second data communication bus 226 or path which could be a CAN bus implementing SAE J1939 via twisted pair cabling. However, in alternative arrangements, the joystick 220 and/or the HMI 222 could be connected on the same data communication bus, or on different types of communication interfaces or paths, within the scope of the present invention.

In the ambient lighting system 200, the machine controller 202 may also be connected to a hydrostatic drive system interface 230 and an engine interface 232. The machine controller 202 may connect to both the hydrostatic drive system interface 230 and the engine interface 232, for example, via a third data communication bus 234 connected to port P3 which could be a CAN bus implementing SAE J1939 via twisted pair cabling, thereby providing additional functions. The hydrostatic drive system interface 230 may, in turn, connect to one or more motors 236, pumps 238 and/or sensors 240 for affecting hydrostatic drive operation for the sprayer 15. Similarly, the engine interface 232 may, in turn, connect to one or more sensors 242 and/or actuators 244 for affecting engine operation for the sprayer 15.

Accordingly, commands provided by an operator in the cab 30, via the joystick 220, the HMI 222, a steering wheel (not shown) or other input module, may be received by the machine controller 202 and routed to the corresponding system interface on the third data communication bus 234, such as to the hydrostatic drive system interface 230 or the engine interface 232. For example, moving the joystick 220 may result in sending a command to the machine controller 202, which, in turn, may result in the machine controller 202 sending an instruction to the engine interface 232 to adjust speed.

The machine controller 202 can also connect to a plurality of machine specific control modules 250, such as modules "A," "B," "C" and "D." Each of the machine specific control modules 250 may connect to the machine controller, for example, via a fourth data communication bus 260 connected to port P3, which could be a CAN bus implementing machine specific protocol via ISO 11783 twisted pair cabling. Each of the machine specific control modules 250 may be configured to control other functions of the sprayer 15. For example, (1) module A may be an agricultural product rate application module, which may control an agricultural product application function; (2) module B may be an automatic steering module, which may control an automatic steering function; (3) module C may be a sprayer boom height module, which may control a sprayer boom height adjustment function; and (4) module D may be a sprayer boom folding module, which may control a sprayer boom folding function. Accordingly, each of the machine specific control modules 250 may connect, in turn, to one or more sensors 252 and/or actuators 254 disposed on the sprayer 15 for accomplishing the respective function.

A Virtual Terminal (VT) or field computer 270 may also be connected to the fourth data communication bus 260 for communication with the modules "A," "B," "C" and "D." The field computer 270 could be a mobile computing system including a graphical display 272 for accomplishing various farming related functions and may be connectable to the fourth data communication bus 260 via a connector 274. The field computer 270 could be, for example, an Advanced Farming Systems Pro 700 as available from CNH industrial. An operator in the cab 30 may use the field computer 270 to control functions of the agricultural machine as controlled by the modules "A," "B," "C" and "D." For example, on a first screen page provided to the display 272, the field computer 270 could provide monitoring and control with respect to agricultural product application via module A. Similarly, on a second screen page provided to the display 272, the field computer 270 could provide monitoring and control with respect to automatic steering via module B, and so forth.

Figure 3:
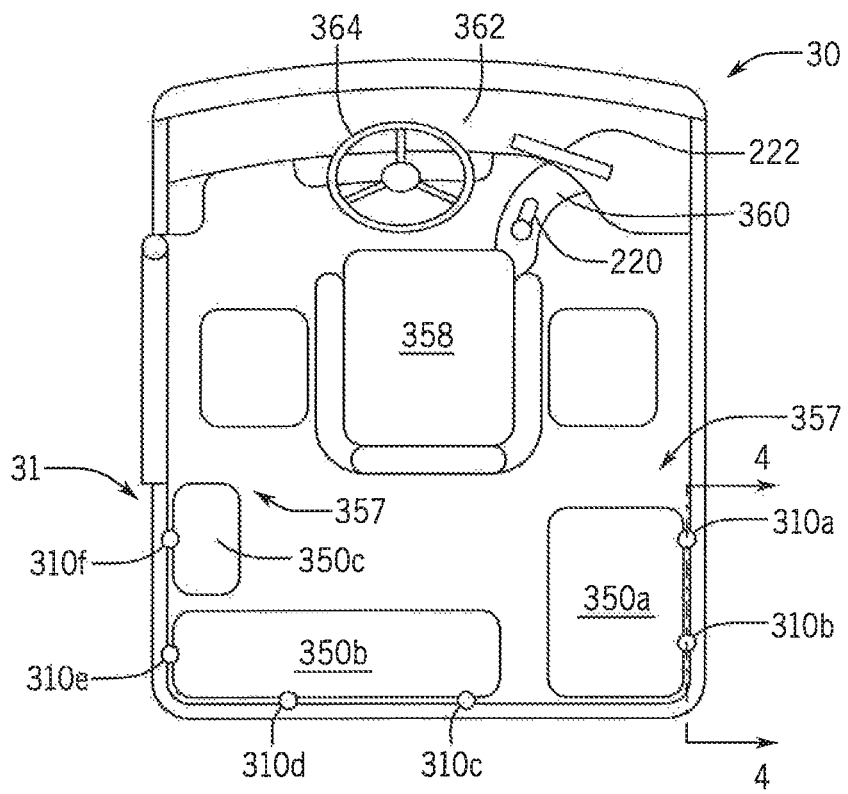
FIG. 3 is an exemplar overhead view of an interior of an operator cab of the agricultural machine of FIG. 1.
Figure 4:
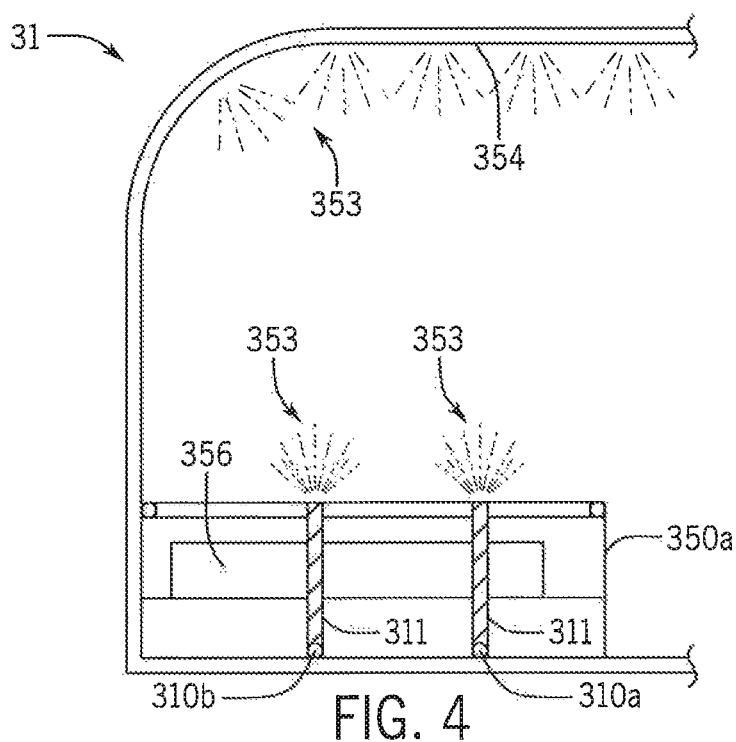
FIG. 4 is a cross sectional view of a rearward portion of the operator cab of FIG. 3.

The machine controller 202 can also be in communication with an ambient lighting controller 300, via a port 208. The ambient lighting controller 300 may be connected, for example, to port P5, via a fifth data communication bus 302 or path which could be a CAN bus implementing SAE J1939 via twisted pair cabling. The ambient lighting controller 300 may include a processing element 304 and a memory 306. The ambient lighting controller 300, in turn, can control a group of multicolor lights 308 configured to provide ambient lighting in the cab 30. With additional reference to FIGS. 3 and 4, the group of multicolor lights 308 can include individual multicolor lights 310, such as lights 310a-f, distributed in the cab 30, particularly with respect to a back or rearward portion 31 of the cab 30, for providing the ambient lighting in the cab 30. The lights 310 can each include a light pipe 311 configured to transport light around structures 350 in the cab 30, such as storage compartments, fuse boxes, seating areas, trim mold, paneling, and the like, to project the light in interior areas of the cab 30, such as a ceiling or overhead area 354 of the cab 30. For example, first and second lights 310a and 310b, respectively, can each include light pipes 311 configured to transport light around a first structure 350a in the cab 30, which could be storage compartment housing electrical fuses 356 for the sprayer 15, to project the light 353 onto the overhead area 354 and/or side areas 357 inside the cab 30. As a result of such light projection, a forward facing operator, seating in an operator's chair 358 in the cab 30, can perceive the light from the lights 310 indirectly with peripheral vision as the light is reflected from such interior areas. Moreover, by arranging the lights 310 in the rearward portion 31 of the cab 30, behind a forward facing operator, the lights 310 can project the ambient lighting for reflection on the interior surfaces without distracting the operator's attention from forward area controls, such as the HMI 222, the joystick 220, armrest controls 360, an instrument panel 362 or steering wheel 364.

The ambient lighting controller 300 can execute a program 320 stored in a non-transient storage medium 322 to monitor the aforementioned functions of the sprayer 15, including the spray sections, automatic steering, height control of the center section with respect to the boom 17, tilt control of the boom 17, engine speed control, hydrostatic drive and engine systems, and/or various modules, such as the modules "A," "B," "C" and "D." The ambient lighting controller 300 can then determine a state for the sprayer 15 from among multiple states in a state table 323 according to one or more of the monitored functions as configured by logic rules. The state table 323, which can also be stored in the storage medium 322, can track such states to reflect corresponding functions, which could include: a first state indicating a normal state for corresponding functions; a second state indicating a fault state for corresponding functions; and/or one or more custom states which could be configured by the operator. The ambient lighting controller 300 can then illuminate the group of multicolor lights 308 in a same color and a same pattern to produce the ambient lighting to indicate a determined state, It should be appreciated that the ambient lighting produced by the group of multicolor lights 308 can advantageously be in different colors and different patterns at different times to reflect different states as desired. The group of multicolor lights 308 can produce light in colors which minimize glare, such as red, blue, green and/or yellow, to provide optimum visibility in the cab 30, particularly in low light conditions outside, while also providing a first encoding of useful information about the sprayer 15 to the operator. In addition, the group of multicolor lights 308 can produce light in patterns which minimize the operator's attention, such as continuously lit, and/or draws the operator's attention, such as flashing, for providing a second encoding of useful information about the sprayer 15 to the operator. Also, the group of multicolor lights 308 can produce the light to indirectly illuminate areas of the cab 30 without requiring the operator to actuate a dome light which might typically produce glare.

For example, the ambient lighting controller 300 might control the group of multicolor lights 308 in the first state, to indicate a normal state for all monitored functions, which might comprise operating the lights 310 to produce blue light in a continuously lit pattern. However, upon detecting a fault condition with respect to any monitored function, the ambient lighting controller 300 might transition to control of the group of multicolor lights 308 in the second state, to indicate a fault state for a monitored function, which might comprise operating the lights 310 to produce red light in a flashing pattern. A fault state for a monitored function could include, for example, spray sections sensed as activated when they should be deactivated, or deactivated when they should be active, such as according to a prescription map, the boom 17 being sensed as tilted or lowered too close to the ground, low fuel or oil pressure with respect to the engine, and the like.

In addition, the operator can update the state table 323 from default conditions, such as through the HMI 222, to modify and/or add states for the ambient lighting. For example, the operator could: change the first state (normal state) to instead produce green light in a continuously lit pattern; change the second state (fault state) to instead produce the red light in a flashing pattern only upon one or more enumerated fault conditions, such as only when the boom 17 is being sensed as tilted or lowered too close to the ground; and/or add a third state (custom state) to produce the yellow light in a continuously lit pattern upon another enumerated condition, such as when a Global Positioning System (GPS) of the sprayer 15 indicates a geographic departure from a loaded prescription map of the field.

Figure 5:
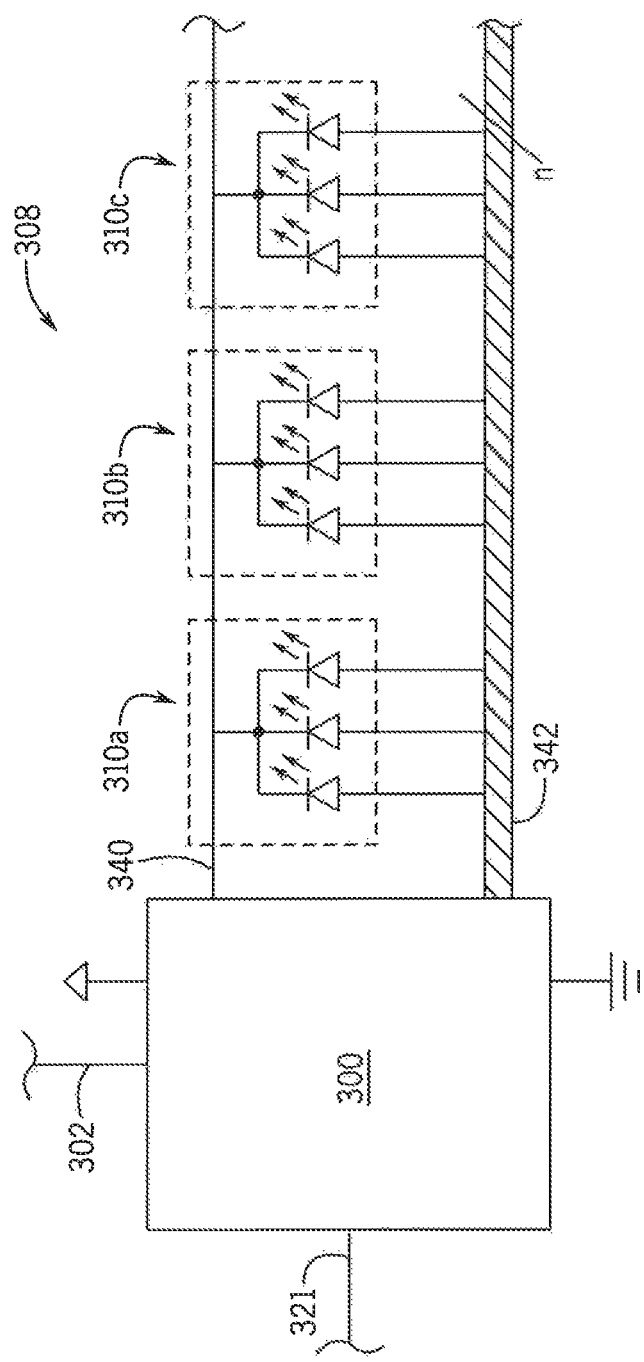
FIG. 5 is an exemplar schematic for controlling multicolor lights in the ambient lighting system of FIG. 2.

Referring now to FIG. 5, is an exemplar schematic for controlling the group of multicolor lights 308 is provided. Each light 310 of the group of multicolor lights 308 may comprise a plurality of Light Emitting Diodes (LED's) for producing the multiple colors according to the various states. In one aspect, each light 310 could include first, second and third LED's for illuminating red, green and blue colors, respectively, so that a broad spectrum of possible colors can be configured for each light 310 by the ambient lighting controller 300 as desired by activating the first, second and third LED's in various ways. However, in another aspect, the first, second and third LED's could correspond to the first, second and third colors, such as green, red and yellow, for the first, second and third states, respectively. Moreover, additional LED's of different colors could be provided for each light. 310 for additional colors corresponding to additional states.

In one aspect as shown in FIG. 5, the ambient lighting controller 300 could provide a common cathode 340 for each of the LED's of each of the lights 310, while individually controlling multiple anode lines 342 in a bus arrangement of "n" signals. For the lights 310a-f illustrated in FIGS. 2 and 3 by way of example, the bus arrangement could include eighteen anode lines 342 (six lights*three anode lines per light). However, in an alternative aspect, the ambient lighting controller 300 could provide a common anode for each of the LED's of each of the lights 310, while individually controlling multiple cathode lines in the bus arrangement.

Many changes and modifications could be made to the invention without departing from the spirit thereof. The scope of these changes will become apparent from the appended claims.

We claim:

1. An ambient lighting system for an agricultural machine, the ambient lighting system comprising:
a plurality of multicolor lights arranged in an operator cab, each multicolor light having a light pipe configured to transport light around a structure in the operator cab to project the light in an interior area of the operator cab so that the light is perceivable by a forward facing operator in the operator cab; and
an ambient lighting controller in communication with the plurality of multicolor lights, the ambient lighting controller executing a program stored in a non-transient medium to:
monitor a plurality of functions of the agricultural machine, the plurality of functions including at least one of operating a spray section of the agricultural machine or positioning of a boom of the agricultural machine;
determine a state from among a plurality of states according to one or more of the monitored functions;
illuminate the plurality of multicolor lights in a first one of a plurality of colors in response to the determined state of the one or more monitored functions, each color of the plurality of colors corresponding to one of the plurality of states of the one or more monitored functions; and
flashing at least a portion of the plurality of multicolor lights in a second one of the plurality of colors in response to determination of a fault state for one of the monitored plurality of functions of the agricultural machine.

2. The ambient lighting system of claim 1, wherein the plurality of multicolor lights are configured in a rearward portion of the operator cab, behind a forward facing operator.

3. The ambient lighting system of claim 1, wherein the light pipes are configured to project the light onto an overhead area of the operator cab.

4. The ambient lighting system of claim 1, wherein at least one light pipe is configured to transport the light around a storage compartment in the operator cab.

5. The ambient lighting system of claim 4, wherein the storage compartment houses a plurality of electrical fuses for the agricultural machine.

6. The ambient lighting system of claim 1, wherein each multicolor light comprises a plurality of Light Emitting Diodes (LED's).

7. The ambient lighting system of claim 1, wherein the ambient lighting controller is configured to control the multicolor lights to project light in at least two colors which minimize glare.

8. The ambient lighting system of claim 7, wherein the at least two colors which minimize glare are selected from the group consisting of: red, blue, green and yellow.

9. The ambient lighting system of claim 1, wherein the ambient lighting controller is configured to control the multicolor lights to project light in at least two patterns, including continuously lit and flashing.

10. An agricultural sprayer comprising:
a chassis supported by a plurality of wheels;
a sprayer boom extending transversely relative to the chassis;
an operator cab supported by the chassis, the operator cab including a plurality of multicolor lights, each multicolor light having a light pipe configured to transport light around a structure in the operator cab to project the light in an interior area of the operator cab so that the light is perceivable by a forward facing operator in the operator cab; and
an ambient lighting controller in communication with the plurality of multicolor lights, the ambient lighting controller executing a program stored in a non-transient medium to:
monitor a plurality of functions of the agricultural sprayer, the plurality of functions including at least one of operating a spray section of the agricultural sprayer or positioning of the sprayer boom;
determine a state from among a plurality of states according to one or more of the monitored functions;
illuminate the plurality of multicolor lights in a first one of a plurality of colors in response to the determined state of the one or more monitored functions, each color of the plurality of colors corresponding to one of the plurality of states of the one or more monitored functions; and
flashing at least a portion of the plurality of multicolor lights in a second one of the plurality of colors in response to determination of a fault state for one of the monitored plurality of functions of the agricultural machine.

11. The agricultural sprayer of claim 10, wherein the plurality of multicolor lights are configured in a rearward portion of the operator cab, behind a forward facing operator.

12. The agricultural sprayer of claim 10, wherein the light pipes are configured to project the light onto an overhead area of the operator cab.

13. The agricultural sprayer of claim 10, wherein at least one light pipe is configured to transport the light around a storage compartment in the operator cab.

14. The agricultural sprayer of claim 13, wherein the storage compartment houses a plurality of electrical fuses for the agricultural sprayer.

15. The agricultural sprayer of claim 10, wherein each multicolor light comprises a plurality of Light Emitting Diodes (LED's).

16. The agricultural sprayer of claim 10, wherein the ambient lighting controller is configured to control the multicolor lights to project light in at least two colors which minimize glare.

17. The agricultural sprayer of claim 16, wherein the at least two colors which minimize glare are selected from the group consisting of: red, blue, green and yellow.

18. The agricultural sprayer of claim 10, wherein the ambient lighting controller is configured to control the multicolor lights to project light in at least two patterns, including continuously lit and flashing.

* * * * *